3,326,759
ANTIBIOTICS MACROCIN AND LACTENOCIN
Robert L. Hamill and William M. Stark, Indianapolis, Ind., assignors to Eli Lilly and Company, Indianapolis, Ind., a corporation of Indiana
Filed July 19, 1962, Ser. No. 210,904
3 Claims. (Cl. 167—65)

This invention relates to novel antibiotic compounds. More particularly, it relates to novel antibiotic compounds of the macrolide series and to processes for their preparation.

The novel antibiotics provided by this invention have been named macrocin and lactenocin. The two antibiotics are closely related in that lactenocin can be derived from macrocin by an acidic hydrolysis reaction. The two novel antibiotics have similar chemical, pharmacological, and antimicrobial properties but can be distinguished on the basis of their physical properties. Both compounds contain at least one basic amino group which can react with acids to form acid addition salts, and these acid addition salts are included within the scope of this invention.

Macrocin, the antibiotic having higher molecular weight, is a white crystalline base which melts with decomposition at about 134–136° C. The antibiotic crystallizes readily in the form of small transparent colorless blades from a number of solvents such as water, aqueous acetone, aqueous methanol, and aqueous ethanol.

Macrocin is soluble in slightly acidic aqueous media, for example, 5 percent aqueous acetic acid. Macrocin is also slightly soluble in water and in mildly alkaline aqueous media. Additionally it is soluble in most polar organic solvents, as for example, ketones such as acetone, methyl ethyl ketone and methyl isobutyl ketone; alcohols such as methanol and ethanol; esters such as ethyl acetate and ethyl formate; halogenated hydrocarbons such as methylene dichloride and chloroform; ethers such as diethyl ether and dimethyl ether; amides such as dimethylformamide; tertiary organic bases such as pyridine and triethylamine; heterocyclic organic compounds such as tetrahydrofuran and thiophene; and aromatic hydrocarbon solvents such as benzene. Macrocin is relatively insoluble, however, in nonpolar solvents of the aliphatic hydrocarbons class, as for example, hexane and heptane.

Electrometric titration of macrocin in 66 percent (by volume) aqueous dimethylformamide solution (2 parts dimethylformamide to 1 of water) reveals the presence of one titratable group, which has a $pK'_a = 7.0$.

The molecular weight of macrocin, calculated from the titration data, is about 909.

The following is an average of several elemental analyses of crystalline macrocin dried in vacuo at about 80° C. over phosphorus pentoxide:

| | Percent |
|---|---|
| Carbon | 60.99 |
| Hydrogen | 8.50 |
| Nitrogen | 1.45 |
| Oxygen (by difference) | 29.06 |

Analyses for various groups have also been carried out on dried crystalline macrocin, and the following average values have been obtained:

| | Percent |
|---|---|
| Methoxyl | 3.59 |
| N-methyl | 8.98 |
| C-methyl | 9.96 |

These group analyses indicate the presence of one methoxyl, two N-methyl, and at least six C-methyl groups in the macrocin molecule.

The above analytical data establish an empirical formula of $C_{46}H_{79}NO_{17}$.

Figure 1:
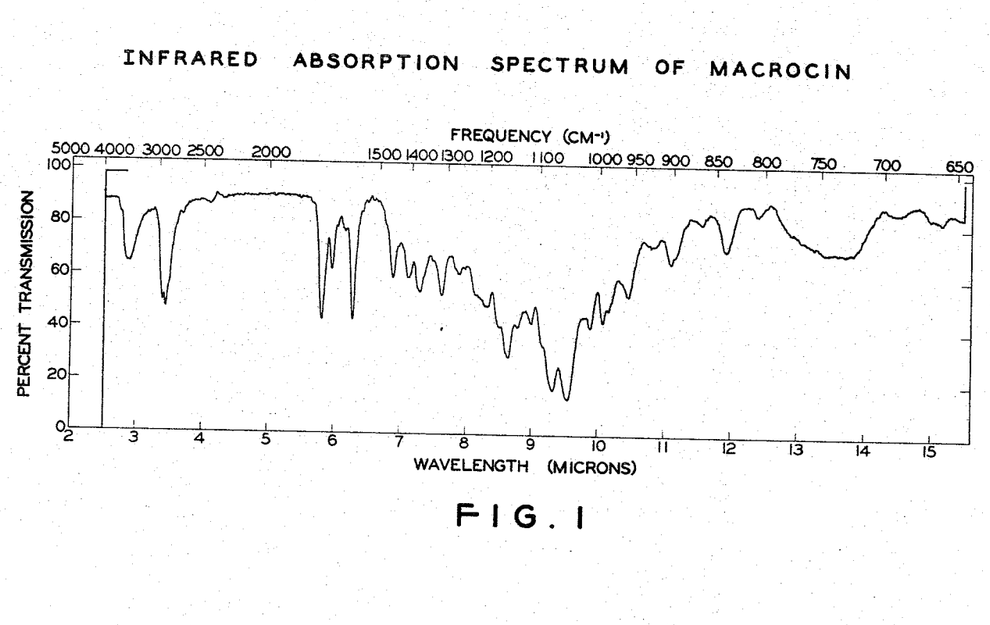

The infrared absorption curve of macrocin as the crystalline free base in chloroform solution is shown in FIG. 1 of the accompanying drawings. The distinguishable bands in the infrared spectrum over the range of $2.0\mu$ to $15.0\mu$ are as follows: 2.81, 3.35, 3.40, 5.81, 5.95, 6.28, 6.88, 7.10, 7.27, 7.62, 7.89, 8.45, 8.61, 8.78, 8.98, 9.30, 9.53, 9.88, 10.05, 10.15, 10.45, 10.81, 11.10, 11.55, and 11.90.

Figure 3:
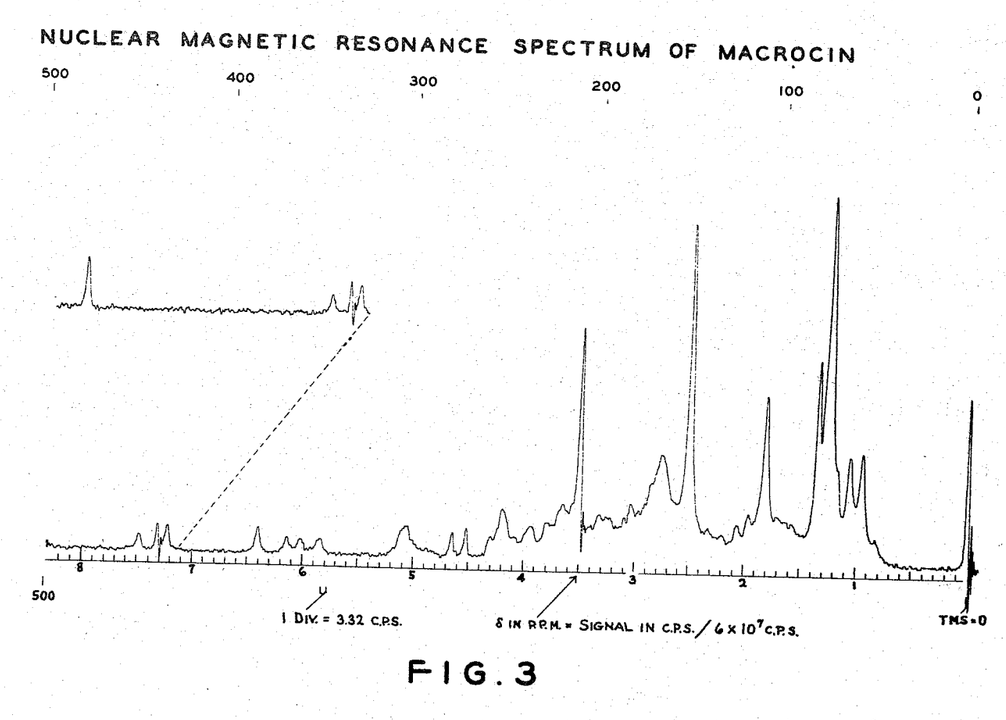

Macrocin has a distinguishing nuclear magnetic resonance spectrum which is shown in FIG. 3 of the accompanying drawings.

The ultraviolet absorption spectrum of macrocin in aqueous solution shows an intense absorption maximum at about 282 m$\mu$, with a molar extinction of $$E^{1\%}_{1cm.} = 244$$

The specific optical rotation of crystalline macrocin, dried at room temperature in vacuo over anhydrous calcium chloride for about 15 hours, is as follows: $[\alpha]_D^{25} = -52.50$; $[c=2$ percent in methanol (w./v.)].

An X-ray diffraction powder pattern of macrocin using unfiltered chromium radiation at a wave-length value of 2.2896 A. gave the following interplanar distances and relative intensity of reflected radiation:

| d | I/I$_1$ |
|---|---|
| 11.70 | .20 |
| 10.21 | .10 |
| 9.20 | .30 |
| 8.22 | .10 |
| 7.55 | 1.00 |
| 6.88 | 1.00 |
| 6.36 | 1.00 |
| 6.04 | 1.00 |
| 5.63 | .10 |
| 5.36 | 1.00 |
| 5.09 | .75 |
| 4.86 | .10 |
| 4.58 | .75 |
| 4.37 | .75 |
| 4.09 | .75 |
| 3.94 | .20 |
| 3.79 | .10 |
| 3.65 | .10 |
| 3.51 | .20 |
| 3.39 | .20 |
| 3.19 | .40 |
| 3.00 | .20 |
| 2.92 | .20 |
| 2.76 | .30 |
| 2.69 | .30 |
| 2.59 | .05 |
| 2.49 | .10 |
| 2.33 | .20 |
| 2.27 | .10 |
| 2.20 | .10 |
| 2.15 | .05 |
| 2.10 | .05 |
| 2.06 | .10 |
| 2.01 | .10 |
| 1.963 | .10 |
| 1.904 | .10 |

Table 1 below gives the results of standard chemical color tests as applied to macrocin:

TABLE 1

| Test: | Results |
|---|---|
| Molisch | Positive. |
| Anthrone | Positive. |
| Permanganate | Decolorizes. |
| Ninhydrin | Negative. |
| Biuret | Negative. |
| Sakaguchi protein | Negative. |

Chromatography of macrocin on Whatman No. 1 filter paper gives $R_f$ values as follows in a variety of chromatographic systems.

| System | $R_f$ | Remarks |
|---|---|---|
| Methyl ethyl ketone on pH 4 buffered paper. | 0.43 | |
| Methyl ethyl ketone | 0.66 | |
| n-Butanol saturated with water on pH 4 buffered paper. | 0.92 | |
| n-Butanol saturated with water. | 0.80 | Ratio of movement in relation to the end of paper, not solvent front. Solvent ran off end of paper. |
| Water with 7 percent NaCl and 2.5 percent methyl ethyl ketone. | 0.74 | |
| Ethyl acetate saturated with water on pH 4 buffer paper. | 0.39 | Ratio of movement in relation to the end of paper not solvent front. Solvent ran off end of paper. (16 hrs. at 22° C.) |

Macrocin is relatively stable in aqueous solution over a pH range from about pH 4 to about pH 9 but is relatively unstable in strongly acidic or basic solutions. When macrocin is dissolved in an aqueous acid solution having a pH of about 2 to 3 and is allowed to remain in this acidic medium at ambient room temperature for several hours, a hydrolysis reaction occurs. The products of this reaction are lactenocin (the other antibiotic provided by this invention) and the carbohydrate mycarose. Mycarose has the following structural formula:

Treatment of either macrocin or lactenocin under more stringent reaction conditions (for example, refluxing in 3 N aqueous hydrochloric acid solution) yields a second identifiable fragment, the amino sugar mycaminose, which can be represented by the following formula:

Macrocin, either in the form of the free base or as an acid addition salt thereof, has pronounced antibiotic activity against a variety of standard test organisms, including both Gram-positive and Gram-negative bacteria. Macrocin was tested for its inhibitory power against these organisms either by an agar-dilution or by a broth-dilution test.

In the agar-dilution test, the test organism was streaked on a series of agar plates containing various concentrations of macrocin to determine the minimum concentration of macrocin base in mcg./ml. (micrograms per milliliter) in the agar substrate which inhibited the growth of the organism over a period of forty-eight hours (seventy-two hours in the case of the plant pathogen *Erwinia amylovora*).

In the broth-dilution test, a series of tubes containing nutrient broth containing varied concentrations of macrocin were inoculated with the test organism to determine the minimum concentration of macrocin in mcg./ml. in the broth substrate which inhibited organism growth for a period of about twenty hours.

Table 2, which follows, lists the names of the test organisms, and the minimal inhibitory concentration of macrocin for these organisms in mcg. per ml.

TABLE 2

| Test organism: | Inhibitory concentration, mcg./ml. |
|---|---|
| Staphylococcus aureus | 0.78 [1] ad |
| Staphylococcus aureus 3055 | 0.625 [2] bd |
| Staphylococcus albus | 1.56 ad |
| Bacillus subtilis | 0.78 ad |
| Sarcina lutea | 0.1 ad |
| Mycobacterium tuberculosis (607) | 0.4 ad |
| Mycobacterium avium | 0.4 ad |
| Diplococcus pneumoniae Park I | 0.15 bd |
| Streptococcus C203 | 0.15 bd |
| Corynebacterium diphtheriae | 0.035 bd |
| Klebsiella pneumoniae | 50 ad |
| Shigella paradysenteriae | 25 ad |
| Brucella bronchiseptica | 100 ad |
| Vibrio metschnikovii | 50 ad |
| Corynebacterium michiganense | 0.2 ad |
| Erwinia amylovora | 100 ad |

[1] ad=agar dilution.
[2] bd=broth dilution.

According to Table 2 above, macrocin has a relatively broad antimicrobial activity, and this ability to inhibit the growth of microorganisms can be demonstrated by microcin not only invitro but also in vivo. Thus, administration of macrocin to animals infected with various pathogenic organisms results in the prompt elimination of the infection. Macrocin is effective in eliminating disease in animals when administered either orally or parenterally. Table 3 which follows, illustrates the use of macrocin in curing three different infections in mice. The table lists the infecting organism, the number of $LD_{50}$'s (median lethal doses) of infecting organism administered, the route of administration, and the dose of macrocin which protects 50 percent of the tested animals ($ED_{50}$) against the lethal effects of the organism:

TABLE 3

| Infecting Organism | No. of $LD_{50}$'s | Route of Administration | $ED_{50}$, mg./kg. |
|---|---|---|---|
| Staphylococcus aureus | 1,107 | Subcutaneous | 12.8×2 |
| Staphylococcus aureus | 1,107 | Oral | 83 |
| Diplococcus pneumoniae | 685 | Subcutaneous | 30.9×2 |
| Diplococcus pneumoniae | 685 | Oral | 166 |
| Streptococcus pyogenes | 2,500 | Subcutaneous | 1.72 |
| Streptococcus pyogenes | 2,500 | Oral | 146 |
| Borrelia novyi | | do | 62.5 |

In addition, when macrocin was administered by the oral route to rats infected with *Endamoeba histolytica*, the calculated median effective dose was 40 mg./kg.

Macrocin is also extremely effective in vitro against many viruses, particularly avian strains of PPLO (pleuropneumonia-like organisms). Table 4, which follows, lists the strains of PPLO employed in the test and also the minimal inhibitory concentration of macrocin in mcg./ml. for each PPLO strain:

TABLE 4

Effect of Macrocin on Growth of PPLO in vitro:

| PPLO strain: | Inhibitory concentration, mcg./ml. |
|---|---|
| 699 | 0.25 |
| 295 | 4.0 |
| 1991 | 8.0 |
| 2453 | 8.0 |

As with bacterial infections, macrocin can also be employed to combat in vivo virus infections. For example, injection of young chickens with macrocin at the rate of 25 mg./kg. of body weight was highly effective in controlling PPLO in these birds.

Macrocin, in addition to its effects against pathogenic bacteria and viruses, possesses a strong inhibitory effect on the growth of many of the spore-forming anaerobic organisms belonging to the genera Bacillus, Clostridium, and the like, which organisms account for much of the food spoilage encountered in the canning and meat packing industries. On the other hand, unlike other antibiotics which inhibit the growth of the spore-forming anaerobes, macrocin does not inhibit the growth of the lactic acid producing bacteria belonging to the genus Streptococcus at concentrations at which the food-spoiling anaerobes are substantially completely inhibited. For example, 5 p.p.m. of macrocin inhibits only 50 percent of the growth of *S. faecium* F 24, 30 percent of *S. lactis* X 66, and 35 percent of *S. faecium* P 843, whereas the growth of *Clostridium sporogenes*, *C. butyricum*, and *C. acetobutyricum* are 90 percent inhibited at this same concentration. These findings indicate that macrocin would be an excellent antibiotic for the preservation of silage since it does not affect the "good" lactic acid fermentations at concentrations at which it will stop the "bad" spoilage fermentations.

In addition to its antibacterial and antiviral effects, macrocin has surprisingly been extremely effective in increasing the growth rate of hogs when added to their diet at the rate of about 20 to 40 grams per ton of feed and in increasing the growth rate of chickens and turkeys when added to their diet in a concentration of around 4 grams per ton of feed.

Macrocin can be produced by culturing newly found and hitherto undescribed organism strains which have been placed on permanent deposit with The Culture Collection of the Northern Utilization Research and Development Branch of the U.S. Department of Agriculture, Peoria, Ill., and have been assigned the culture numbers NRRL 2702 and NRRL 2703. These organism strains are in many respects quite similar to the species *Streptomyces fradiae*, a member of the order Actinomycetales, as defined in Bergey's Manual of Determinative Bacteriology, 7th Edition, page 799. Although there is some inherent uncertainty in classification of such microorganisms, it is believed that our novel organisms NRRL 2702 and NRRL 2703 can properly be classified as new strains of the species *S. fradiae* and that the Waksman strain of *S. fradiae*, obtained from the American Type Culture Collection and identified as ATCC 10745 (Waksman 3535) is the most closely related of previously known organisms. One notable difference between our novel strains and the Waksman strain of *S. fradiae* lies in the failure of the Waksman strain to produce macrocin. The Waksman strain has been cultured in the preferred media herein described, but no detectable amount of macrocin has ever been observed.

The process for producing macrocin by fermentation will be described in detail with particular reference to the organism, NRRL 2702. It is to be understood, however, that the production of the antibiotic by the growing of other macrocin-producing strains such as NRRL 2703, or mutants of NRRL 2702 and NRRL 2703 is within the scope of this invention. Such other organisms, strains, or mutants can be produced by known mutagenic procedures, for example, by subjecting a macrocin-producing organism to X-ray or ultraviolet irradiation, or to chemical agents such as the nitrogen mustards.

In the following paragraphs, the result of a detailed taxonomic study of the above macrocin-producing strain of *S. fradiae*, NRRL 2702, are set forth. The colors used in the description are in accordance with the definitions used in Ridgway, Culture Standards and Nomenclature (1912).

Microscopic morphology

*Tomato paste-oatmeal agar (14 days at 30° C.).—* Spore chains are in hooks, loops, and irregular coils. Typical spirals are rarely found. Spores are sub-globose in shape and range from about $0.8\mu$ to about $1.5\mu$.

*Inorganic salts-starch agar (14 days at 30° C.).—* Microscopic morphology like that observed on tomato paste oatmeal agar.

*Inorganic salts-ribose agar (14 days at 30° C.).—* Microscopic morphology like that observed on tomato paste oatmeal agar.

Cultural Characteristics

*Czapek's agar (14 days at 30° C.).—*Growth fair. No aerial mycelium. Reverse near Cream Color.

*Calcium malate agar (14 days at 30° C.).—*Growth moderate. Cream Buff in areas. Reverse Naples Yellow.

*Glucose-Asparagine agar (14 days at 30° C.).—*Growth very scant.

*Inorganic salts-starch agar (14 days at 30° C.).—* Growth abundant. Aerial mycelium moderate, white to Pale Ochraceous Salmon. Reverse near Cream Buff.

*Tomato paste-oatmeal agar (14 days at 30° C.).—* Growth abundant. Aerial mycelium moderate, from white to Vinaceous Buff.

*Emerson's agar (14 days at 30° C.).—*Growth moderate. Aerial mycelium fair, white. Reverse near Ochraceous Buff.

*Yeast Extract agar (14 days at 30° C.).—*Growth moderate. Aerial mycelium fair, white. Reverse Antimony Yellow.

*Potato Plug agar (14 days at 30° C.).—*No visible growth.

Physiology

Gelatin liquefaction: Slow
Nitrate reduction: Reduces nitrates
$H_2S$ production: None
Starch hydrolysis: Fair
Optimum growth temperature: 26–30° C.
Optimum sporulation temperature: 32–37° C.
No aerial mycelium produced at 26° C.

In Table 5 are set forth results of carbon utilization tests carried out on organism NRRL 2702. In the table, the following symbols are employed:

+ =Growth and utilization.
− =No growth, no utilization.
± =Limited growth, probably poor utilization.

TABLE 5

*Carbon utilization pattern for NRRL 2702*

| Compound | Growth Response |
|---|---|
| L (+) Arabinose | + |
| L (+) Rhamnose | ± |
| D (+) Ribose | − |
| D (+) Xylose | + |
| D (−) Fructose | + |
| D (+) Glucose | + |
| D (+) Melibiose | − |
| Sucrose | + |
| D (+) Trehalose | + |
| D (+) Melizitose | − |
| D (+) Raffinose | − |
| Cellulose | − |
| Inulin | − |
| Adonitol | − |
| i-Inositol | − |
| Mannitol | ± |
| Sodium acetate | + |
| Salicin | − |

As noted, macrocin can be produced by cultivation of NRRL 2702 or NRRL 2703. The culture medium employed can be any one of a number of media since, as is apparent from the above-described utilization tests, the organism is capable of utilizing many energy sources. For economy of production, maximum yields of antibiotic, and ease of isolation of the antibiotic, however, certain culture media are preferable. The media which are useful in the production of macrocin include an assimilable source of carbon such as glucose, sucrose, fructose, starch, glycerine, molasses, dextrin, brown sugar, corn steep solids, and the like. The preferred sources of carbon are glucose and starch. The media should also include a source of assimilable nitrogen such as linseed meal, tankage, fish meal, cotton seed meal, oatmeal, ground wheat, soybean meal, beef extract, peptones (meat or soy), casein, amino acid mixtures, and the like. Preferred sources of nitrogen are soybean meal, casein, and corn steep solids.

Mineral salts, for example, those providing sodium, potassium, ammonium, calcium, magnesium, cobalt sulfate, chloride, phosphate, carbonate, acetate, and nitrate ions, and a source of growth factors such as distillers' solubles and yeast extract can be incorporated into the media with beneficial results.

As is necessary for the growth and development of other microorganisms, essential trace elements should also be included in the culture medium for growing the Actinomycete employed in this invention. Such trace elements are commonly supplied as impurities incidental to the addition of the other constituents of the medium.

The initial pH of the culture medium can be varied widely. However, it has been found that the initial pH of the medium desirably is between about pH 5.5 and about pH 8.0, and preferably is between about pH 6.5 and about pH 7.0. As has been observed with other Actinomycetes, the pH of the medium gradually increases throughout the growth period of the organism during which time macrocin is produced, and may attain a pH from about pH 7.2 to about pH 8.0 or above, the final pH being dependent at least in part on the initial pH of the medium, the buffers present in the medium, and the period of time the organism is permitted to grow.

Submerged, aerobic cultural conditions are the conditions of choice for the production of large amounts of macrocin. For preparation of relatively small amounts of the antibiotic, shake flasks and surface culture in bottles can be employed. For the preparation of large amounts, however, submerged, aerobic culture in sterilized tanks is preferred. The medium in the sterilized tank can be inoculated with a sporulated suspension. However, because of the growth lag experienced when a sporulated suspension is used as the inoculum, the vegetative form of the culture which does not manifest such a growth lag, is preferred, thereby permitting a more efficient use of the fermentation equipment. Accordingly, it is desirable first to produce a vegetative inoculum of the organisms by inoculating a relatively small quantity of culture medium with the spore form of the organism, and when a young, active, vegetative inoculum has been obtained, to transfer the vegetative inoculum aseptically to the large tank. The medium in which the vegetative inoculum is produced can be the same as or a different medium than that utilized for the large scale production of macrocin.

The organisms grow best at temperatures in the range of about 25° C. to about 32° C. Optimal macrocin production appears to occur at a temperature of about 26–30° C.

As is customary in submerged culture processes, sterile air is blown through the culture medium. For efficient growth of the organism and for substantial macrocin production, the volume of air employed in the tank production method preferably is upwards of 0.1 volume of air per minute per volume of culture medium. Efficient growth and optimal yields of macrocin are obtained when the volume of air used is at least one volume of air per minute per volume of culture medium.

The concentration of macrocin activity in the culture medium can readily be followed during the fermentation period by testing samples of the culture medium for their inhibitory activity against the growth of an organism known to be inhibited in the presence of macrocin. The use of the organism Staphylococcus aureus has been found to be very satisfactory for this purpose. The testing can be carried out by either the turbidimetric or cup plate methods.

In general, after inoculation, maximum production of macrocin occurs within about 2 to 7 days when submerged aerobic culture or shake flask culture is used.

Upon completion of the fermentation, the mycelium and undissolved solids are removed from the fermentation broth by conventional means such as filtration or centrifugation. The macrocin is then removed from the filtered or centrifuged broth in admixture with the antibiotic tylosin, which is also produced in the fermentation, by employing absorption or extraction techniques. Occasionally and in particular if the fermentation broth is maintained at an acidic pH for a considerable length of time during the extraction procedure, the degradation products of macrocin and tylosin, which are the antibiotics lactenocin and desmycosin respectively, may also be present in the crude antibiotic mixture. However, under the usual extraction conditions, only macrocin and tylosin are present and they are extracted and purified together and then separated by various techniques, particularly by countercurrent distribution.

In extracting the tylosin-macrocin mixture from the filtered broth, we customarily employ water-immiscible, polar, organic solvents, such solvents including esters of fatty acids, for example, ethyl acetate and amyl acetate; chlorinated hydrocarbons, for example, chloroform, ethylene, dichloride, and trichloroethylene; water-immiscible ketones, for example, methyl isobutyl ketone and methyl amyl ketone; and ethers, for example, diethyl ether and methyl n-propyl ether. Other solvents of similar character can also be employed. Chloroform and amyl acetate are the presently preferred extraction solvents.

For the recovery of tylosin and macrocin in admixtures by adsorption techniques, various adsorbents can be used, as for example carbon, silica gel, and alumina, as well as ion-exchange resins of acidic character such as "XE 64" and "IRC 50" (weakly acidic cation-exchange resins sold by Rohm and Haas Company), carboxymethylcellulose resin, and "Dowex 50" (a strongly acidic cation-exchange resin sold by The Dow Chemical Company). The tylosin and macrocin can be adsorbed on one of the above or similar adsorbents from a solution in chloroform, acetone, benzene, or other suitable solvents. The adsorbed antibiotics can then be eluted from the adsorbent by suitable elution techniques using as the eluant a lower alcohol, for example, methanol or ethanol, or a lower alcohol containing up to about 50 percent of a lower ketone, for example, acetone.

The organic solvent extract obtained by the preferred extraction and elution method outlined above can be directly evaporated to dryness to provide a crude mixture of macrocin and tylosin. Alternatively, the organic solvent extract can be used to provide a more highly purified antibiotic mixture by concentrating in vacuo the organic solvent antibiotic extract, decolorizing the concentrate with carbon, and precipitating the antibiotic mixture by the addition of a nonpolar organic solvent, for example, hexane. The precipitate which is obtained in either case is an amorphous solid.

A mixture of antibiotics enriched with respect to macrocin can be obtained from a tylosin-macrocin mixture by selective extraction of tylosin with a water-immiscible organic solvent from an aqueous solution at an acidic pH. The solution can the be made alkaline and extracted with a water-immiscible organic solvent to yield another amorphous fraction containing both tylosin and macrocin in which the macrocin content has been enriched 2 to 3 fold with respect to the tylosin content.

Macrocin is most conveniently separated in pure form from a macrocin-tylosin mixture by means of a countercurrent extraction system, usually of about 60 effective stages, using as a source material the macrocin-enriched amorphous antibiotic mixture obtained as outlined above. Crystalline macrocin is then prepared by dissolving the purified antibiotic obtained by the countercurrent distribution or similar purification process in a water-miscible organic solvent and then adding water to this solution.

The solution is stirred at ambient room temperature, during which operation the organic solvent slowly evaporates, thus causing macrocin to precipitate in crystalline form.

As previously set forth, macrocin is converted into lectenocin by hydrolysis with dilute acid. Hydrolysis with strong acid, having an acid strength of the order of 1 to 3 normal or greater, should be avoided, since both macrocin and lactenocin are further degraded under these conditions. More particularly, lactenocin is readily prepared by permitting an aqueous acidic solution of macrocin to remain at room temperature at a pH in the range 2 to 3 until a substantial quantity of lactenocin has been produced. Specifically, an excellent yield of lactenocin can be provided by dissolving macrocin in a concentration of about 4 percent in an acidic aqueous solution, such as dilute aqueous hydrochloric acid at a pH of about 2, permitting the mixture to stand at ambient room temperature for about 3 days, and then recovering the lactenocin from the hydrolysis mixture by neutralizing the mixture and extracting the lactenocin therefrom with a water-immiscible organic solvent.

Lactenocin has generally the same solubility properties and antimicrobial properties as macrocin, but can be characterized by the following specific physical and chemical properties.

Lactenocin is a while solid which is stable in aqueous solution in a pH range of about pH 1 to about pH 9. An electrometric titration of lactenocin in 66 percent dimethylformamide solution (2 parts of dimethylformamide to 1 part of water by volume) reveals the presence of a titratable group having a $pK'_a = 7.8$. The molecular weight of lactenocin as determined by the above titration data is about 770.

An average of several elemental analyses of the solid free base of lactenocin dried in vacuo at 80° C. over phosphorus pentoxide, gave the following analytical values:

|  | Percent |
|---|---|
| Carbon | 59.77 |
| Hydrogen | 8.62 |
| Nitrogen | 1.78 |
| Oxygen (by difference) | 29.83 |

The above data establish an empirical formula of $$C_{39}H_{63}NO_{14}$$

Figure 2:
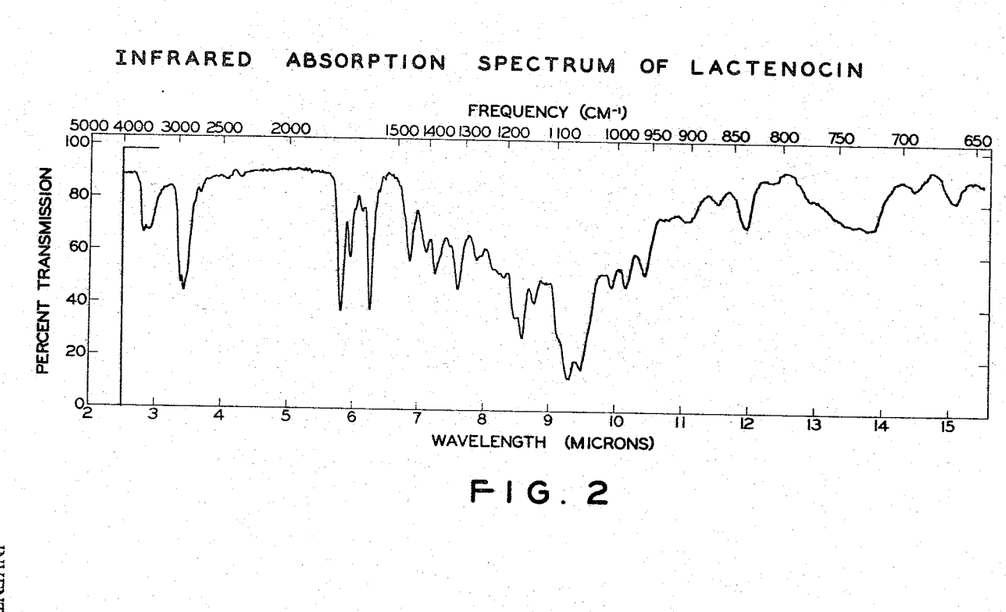

The infrared absorption curve of lactenocin in chloroform solution is shown in FIG. 2 of the accompanying drawings. The distinguishable bands in the infrared spectrum over the range of $2.0\mu$ to $15.0\mu$ are as follows: 2.80, 3.35, 3.40, 5.81, 5.95, 6.28, 6.88, 7.11, 7.25, 7.61, 7.89, 8.45, 8.77, 9.27, 9.45, 9.92, 10.12, 10.42, 10.81, 11.10, 11.55, and 11.97.

Figure 4:
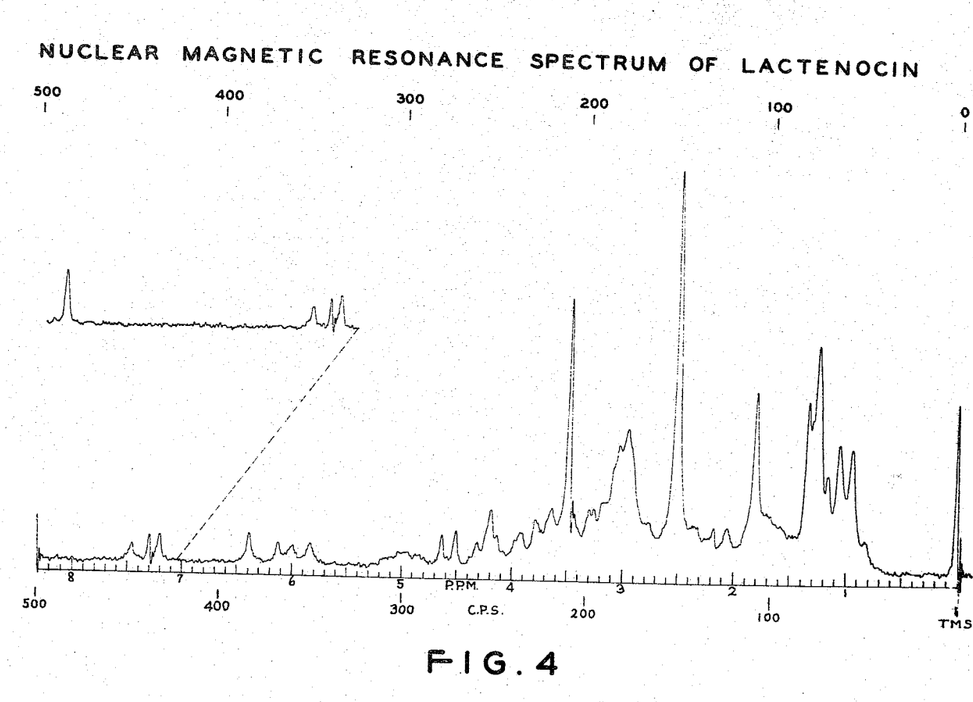

Lactenocin has a distinguishing nuclear magnetic resonance spectrum which is shown in FIG. 4 of the accompanying drawings.

The ultraviolet absorption spectrum of lactenocin in water shows an intense absorption maximum at 283 m$\mu$ with a molar extinction $$E^{1\%}_{1cm.} = 280$$

Chemical tests made on lactenocin show the presence of methoxy, hydroxy, N-methyl, and C-methyl groups. Lactenocin also decolorizes permanganate solution, and gives a positive Molisch test, negative ninhydrin, biuret, and maltol Sakaguchi protein tests, as well as a negative ferric chloride test for phenolic groups.

Chromatography of lactenocin on Whatman No. 1 filter paper gives the following $R_f$ values in a variety of chromatographic systems:

| System | $R_f$ | Remarks |
|---|---|---|
| Methyl ethyl ketone on pH 4 buffered paper. | 0.20 | |
| Methyl ethyl ketone | 0.38 | |
| n-Butanol saturated with water on pH 4 buffered paper. | 0.75 | Ratio of movement in relation to the end of paper, not solvent front. Solvent ran off end of paper. |
| n-Butanol saturated with water. | 0.60 | |
| Water containing 7 percent NaCl and 2.5 percent methyl ethyl ketone. | 0.86 | |
| Ethyl acetate saturated with water on pH 4 buffer paper. | 0.05 | Ratio of movement in relation to the end of paper, not solvent front. Solvent ran off end of paper. (16 hrs. at 2° C.) |

Lactenocin either in the form of the free base or as an acid addition salt thereof has pronounced inhibitory effect aainst a variety of standard test organisms and is useful in combatting diseases caused by these organisms or their close relatives. The inhibitory power of lactenocin was measured using the same agar-dilution and broth-dilution tests described above for macrocin. Table 6 which follows lists the name of the test organism and the minimal inhibitory concentration of lactenocin for these organisms in mcg./ml.

TABLE 6

| Test organism, bacteria: | Inhibitory conc. in mcg./ml. |
|---|---|
| S. aureus | 6.25 [1] ad |
| S. albus | 6.25 ad |
| B. subtilis | 6.25 ad |
| Sarcina lutea | 1.56 ad |
| M. tuberculosis | 50 ad |
| M. avium | 6.25 ad |
| K. pneumoniae | 100 ad |
| S. paradysenteriae | 100 ad |
| B. bronchiseptica | 100 ad |
| V. metschnikovii | 100 ad |
| Fungi: | |
| T. rubrum | 100 ad |
| T. interdigitale | 100 ad |
| Bacterial Plant Pathogens | |
| C. michiganense | 1.56 ad |
| Fungal Plant Pathogens | |
| A. solani | 100 ad |

[1] ad=agar dilution.

As previously stated, both macrocin and lactenocin can form acid addition salts.

These salts can be formed with mineral acids, for example, sulfuric, hydrochloric, phosphoric, hydrobromic, and nitric acids, as well as with organic acids, for example, tartaric, gluconic, oxalic and acetic acids. The acid addition salts can be prepared by dissolving the free base in a solvent, such as acetone or ether, and adding to the solution an eqiuvanlent amount of the appropriate acid. The salt which is formed usually precipitates out of solution. In the event the salt does not precipitate, it can be recovered by evaporating the solution to a smaller volume to permit precipitation, or by adding a miscible solvent in which the salt is not soluble.

This invention is further illustrated by the following specific examples:

*Example 1.—Preparation of macrocin*

A sporulated culture of the NRRL 2702 is produced by growing the organism on a nutrient agar slant having the following composition:

Tomato paste-oatmeal agar:
    Tomato paste _______________________ g__ 20
    Pre-cooked oatmeal __________________ g__ 20
    Agar _______________________________ g__ 15
    Water, added to make a total volume of ____l__ 1

The slant is inoculated with spores of NRRL 2702 and the inoculated slant is incubated for 9 days at a temperature of about 30° C. After incubation, the sporulated culture on the slant is covered with water, and the surface of the slant is scraped gently to remove the spores to obtain an aqueous spore suspension.

Employing aseptic techniques, one-half of the inoculum obtained from one agar slant is used for inoculating a 500 ml. portion of a sterilized vegetative culture medium having the following composition contained in a 2 l. Erlenmeyer flask:

Corn-steep yeast I:
- Glucose ______________________________ g-- 15
- Corn steep solids _____________________ g-- 5
- Yeast _________________________________ g-- 5
- Calcium carbonate ____________________ g-- 3
- Water, added to make a total volume of ____l__ 1

The incubation is carried on at 28° C. for 48 hours with shaking at 110 cycles per minute on a reciprocal shaker having a 2-inch stroke.

0.25 gal. of the vegetative inoculum from the flask is added aseptically as an inoculum to 250 gal. of the sterile corn steep yeast I medium described above contained in an iron 350 gal. fermentor. 0.025 gal. of an antifoam agent is added to the culture medium to prevent excessive foaming, and additional quantities are added as needed during the fermentation. The inoculated medium is fermented for 24 hours at a temperature of 28° C. During fermentation, the medium is aerated with sterile air at a rate of 27 cubic feet per minute and is agitated with two 16-inch impellers operated at 160 revolutions per minute.

To a 1700 gal. iron fermentor are added 1200 gal. of a medium having the following composition:

Corn steep soy XII:
- Glucose ______________________________ kg-- 30
- Soybean oil meal ______________________ kg-- 15
- Corn steep solids _____________________ kg-- 5
- Crude soybean oil ____________________ kg-- 10
- Calcium carbonate ___________________ kg-- 2
- Sodium chloride ______________________ kg-- 5
- Water, added to make a total volume of 1000 l.

The medium is inoculated with 96 gal. of the inoculum grown in the fermentation tank. The fermentation is carried on at 28° C. for four days, and any foaming is controlled by the addition as needed of an antifoam agent. The fermentation medium is aerated by the addition of sterile air at the rate of 128 cubic feet per minute and is agitated with two 24-inch impellers operated at 130 revolutions per minute.

600 pounds of diatomaceous earth are added to the broth, and the mixture is filtered. The filtrate is adjusted to pH 8.5 by the addition of 20 percent sodium hydroxide, 500 gal. of chloroform are added, the mixture is stirred for 30 minutes, and the chloroform layer, which is in the form of an emulsion, is decanted. The chloroform extraction is repeated twice with 500-gal. portions of chloroform. The chloroform emulsions which contain the tylosin and macrocin are combined and are passed through a DeLaval separator to break the emulsion, and the chloroform solution is then concentrated in vacuo to a volume of 25 liters. The impurities are largely removed from the solution by passing it over a column 6 inches in diameter containing 10 kg. of activated carbon. The carbon column is washed with 16 liters of chloroform, and the combined chloroform effluents containing the tylosin and macrocin are concentrated in vacuo to a volume of about 2 liters. The chloroform concentrate is added slowly with stirring to 20 liters of petroleum ether, the mixture is stirred for 15 minutes, and is then filtered to remove the white, amorphous antibiotic mixture which has precipitated. The antibiotic mixture contains both tylosin and macrocin and, afer drying in vacuo, weighs about 1 kg.

Twenty grams of the amorphous antibiotic mixture are suspended in about 100 ml. of water and the pH of the resulting mixture is adjusted to about 3.0 by the addition of concentrated phosphoric acid. The acidic aqueous solution is extracted twice with 50-ml. portions of chloroform. During the extraction, the pH is maintained at 3.0 by the addition as required of 2.5 N aqueous sodium hydroxide. The chloroform extracts are separated and discarded. The pH of the aqueous layer is then adjusted to about 8.5 by the addition of 2.5 normal sodium hydroxide. The resulting alkaline solution is extracted three times with 50-ml. portions of chloroform. The chloroform extracts are combined and dried. The chloroform is removed by evaporation in vacuo leaving as a residue an amorphous powder containing both tylosin and macrocin but in which the macrocin content has been increased 2 to 3 fold relative to the tylosin content.

Five grams of the macrocin-enriched amorphous mixture are dissolved in 100 ml. of ethyl acetate which has previously been equilibrated with 0.1 M sodium phosphate buffer, pH=6.0 The resulting solution is passed through a 60 tube, 100 ml./phase transfer using a Craig countercurrent distribution apparatus. After the countercurrent distribution has been completed, the contents of the individual tubes are assayed for antimicrobial activity and those that show a positive activity are chromatographed on paper using one of the systems previously set forth, all of which are capable of distinguishing macrocin from tylosin. The macrocin is generally found in tubes 20–30. The contents of the tubes which show only the presence of macrocin are combined for further purification.

The combined tube contents containing only macrocin are concentrated in vacuo to remove the ethyl acetate, and the pH of the residual aqueous solution is adjusted to about 8.5 with 2.5 N sodium hydroxide. The resulting alkaline solution is extracted three times with an equal volume of chloroform. The chloroform extracts are combined, dried, and concentrated to about 1/10 the original volume in vacuo. Addition of the chloroform concentrate to 10 times its volume of hexane yields an amorphous white precipitate of macrocin which is separated by centrifugation, and the centrifuged material is dried in vacuo. vacuo.

Amorphous macrocin thus obtained is dissolved in acetone. The acetone solution is filtered and the filtrate is added to eight times its volume of water while the temperature of the water is at 5° C. After the addition has been completed, the solution is stirred slowly at ambient room temperature. During the stirring, the acetone slowly evaporates and concomitantly the macrocin crystallizes. After the macrocin has all crystallized, the crystals are recovered by filtration and are dried in vacuo at ambient room temperature. Crystalline macrocin thus obtained melts at about 134–136° C.

Macrocin can also be produced in high yield by fermenting NRRL 2702 in submerged culture using a synthetic medium in place of the corn steep soy XII given above. This synthetic medium has the following composition:

BASAL FERMENTATION MEDIUM NO. 8

| Component: | Conc. in grams per liter |
|---|---|
| Sodium chloride | 2.0 |
| Magnesium sulfate | 5.0 |
| Cobaltous chloride hexahydrate | 0.001 |
| Ferric ammonium citrate | 1.0 |
| Zinc sulfate heptahydrate | 0.01 |
| Calcium carbonate | 3.0 |
| Glycerine | 7.0 |
| 1-α-alanine | 2.0 |
| 1-valine | 1.0 |
| Betaine | 5.0 |
| Glucose | 35.0 |
| Methyl oleate | [1] 25.0 |
| Potassium acid phosphate | 2.3 |

[1] Ml. per liter.

Example 2.—Alternate macrocin enrichment procedure

The macrocin content of the crude tylosin-macrocin mixture obtained directly from fermentation can also be increased by the following procedure: 20 g. of the amorphous tylosin-macrocin mixture are dissolved in 2 liters of ethyl acetate and the solution is extracted twice with 2 one-liter portions of a 0.1 M sodium phosphate buffer, pH=6.0. The aqueous extracts are combined and the pH of the combined extracts is adjusted to 8.5 by the addition of 2.5 N sodium hydroxide solution. The alkaline aqueous solution is extracted with one-liter portions of chloroform. The chloroform extracts are combined and dried and the chloroform removed by evaporation in vacuo. The residual amorphous powder is a mixture of macrocin and tylosin in which the macrocin content is enriched 2 to 3 fold over that originally present.

Example 3.—Preparation of macrocin tartrate 250 mg. of macrocin are dissolved in 3 ml. of acetone. The solution is mixed with a second solution containing 39.7 mg. of D-tartaric acid dissolved in 2 ml. of acetone. Hexane is added to the acetone solution to the point of turbidity. The resulting mixture is cooled to 5° C. and allowed to stand at this temperature for 16 hours, during which time macrocin tartrate crystallizes. Macrocin tartrate thus prepared is separated by filtration and after being dried in vacuo melts at about 138–140° C. The salt is very soluble in water.

Example 4.—Preparation of macrocin hydrochloride

Two hundred fifty milligrams of macrocin are dissolved in 25 ml. of ether. This solution is added to a second solution containing 0.042 ml. of 12 N hydrochloric acid dissolved in 12.5 ml. of ether. An immediate white precipitate of macrocin hydrochloride comes down. The precipitate is separated by centrifugation. Macrocin hydrochloride thus prepared is an amorphous salt with high water solubility.

Example 5.—Preparation of lactenocin

One gram of macrocin is suspended in 25 ml. of distilled water. Sufficient 6 N hydrochloric acid is added to give a pH in the range of 2 to 3. The acidic solution is allowed to stand at ambient room temperature for about three days. The pH of the solution is then adjusted to about 8.5 by the addition of 2.5 N sodium hydroxide solution. The alkaline solution is extracted three times with 15-ml. portions of chloroform. The chloroform extracts are combined and the combined extracts are washed with 20 ml. of distilled water. The chloroform layer is separated and is concentrated to a volume of about 5 ml. The chloroform concentrate is then added slowly to about 50 ml. of hexane. An amorphous white precipitate of lactenocin forms and is separated by centrifugation and dried in vacuo.

Lactenocin can also be prepared by saturating an acetone solution of macrocin with anhydrous gaseous hydrogen chloride and then adding the acetone solution to ten volumes of hexane, thus causing the lactenocin formed by the action of hydrogen chloride on macrocin to precipitate as an amorphous white solid.

Salts of lactenocin are prepared as set forth in Examples 3 and 4 by substituting lactenocin for macrocin.

Although in the above examples, macrocin has been prepared only in admixture with tylosin, it is well within the skill of the art to select strains of S. fradiae which produces a preponderance of macrocin such that the macrocin could be obtained directly by crystallization without the necessity of a countercurrent distribution, separation procedure or which will produce macrocin exclusively. Similarly, it is well within the skill of the art to find strains of other Actinomycetes which will produce macrocin exclusively. It is also well within the skill of the art to study variations in fermentation time, temperature, pH, as well as various nutrient media and to discover which of these variations or which nutrients will enhance the yield of macrocin with respect to tylosin. A brief study of such variations has already produced an antibiotic mixture of tylosin and macrocin in which the macrocin content is of the order of 30 percent of the whole.

We claim:

1. A compound selected from the group consisting of the antibiotic macrocin and its acid addition salts, said antibiotic being a white solid melting at about 134–136° C. crystallizing in the form of small transparent colorless blades; having a $pK'_a=7.0$ when determined in a 2:1 dimethylformamide-water solution; having molecular weight of about 909; giving the following average values upon elemental analysis after drying in vacuo at about 80° C.: Carbon, 60.99 percent; hydrogen, 8.50 percent; nitrogen, 1.45 percent; oxygen (by difference), 29.06 percent; having an empirical formula corresponding to $C_{46}H_{79}NO_{17}$; analyzing for one methoxy group, two N-methyl groups and at least six C-methyl groups; having an infrared absorption spectrum in chloroform solution substantially as shown in FIGURE 1 in the accompanying drawings and having the following absorption bands given in microns: 2.81, 3.35, 3.40, 5.81, 5.95, 6.28, 6.88, 7.10, 7.27, 7.62, 7.89, 8.45, 8.61, 8.78, 8.98, 9.30, 9.53, 9.88, 10.05, 10.15, 10.45, 10.81, 11.10, 11.55, and 11.90; having a nuclear magnetic resonance absorption spectrum substantially as shown in FIGURE 3 of the accompanying drawings; having an ultraviolet spectrum in aqueous solution characterized by an absorption maximum at about 282 mμ with a molar extinction:

$$E_{1\ cm.}^{1\%} = 244$$

having a specific rotation $[\alpha]_D^{25} = -52.50$ [C=2 percent in methanol (w./v.)]; its crystals showing the following interplanar distances when being subjected to unfiltered chromium X-radiation at a wave-length of 2.2896 A.; 11.70, 10.21, 9.20, 8.22, 7.55, 6.88, 6.36, 6.04, 5.63, 5.36, 5.09, 4.86, 4.58, 4.37, 4.09, 3.94, 3.79, 3.65, 3.51, 3.39, 3.19, 3.00, 2.92, 2.76, 2.69, 2.59, 2.49, 2.33, 2.27, 2.20, 2.15, 2.10, 2.06, 2.01, 1.963, and 1.904; giving positive Molisch and anthrone tests and negative ninhydrin, biuret and Sakaguchi protein tests; decolorizing permanganate solution; giving the following $R_f$ values on paper chromatography; 0.43 in a methyl ethyl ketone solvent on pH 4 buffered paper; 0.66 in methyl ethyl ketone; 0.92 in an n-butanol saturated with water solvent system on pH 4 buffered paper; and 0.74 in water containing 7 percent of sodium chloride and 2.5 percent methyl ethyl ketone; giving upon treatment with aqueuos acid at a pH in the range of about two to three, the carbohydrate, mycarose and the antibiotic, lactenocin; and strongly inhibiting the following micro-organisms: *Staphylococcus aureus, Staphylococcus albus, B. subtilis, Sarcina lutea, M. tuberculosis* (607), *M. avium, Diplococcus pneumoniae* (Park I), *Streptococcus* C203, *C. diphtheriae,* and *C. michiganense.*

2. A compound selected from the group consisting of the antibiotic lactenocin, and its acid addition salts, said antbiotic lactenocin having a $pK'_a=7.8$ when titrated in 2:1 dimethylformamide-water; having a molecular weight of about 770; having an average elemental analysis after drying in vacuo at 80° C. as follows: Carbon, 59.77 percent; hydrogen, 8.62 percent; nitrogen, 1.78 percent; oxygen (by difference) 29.83 percent; having an empirical formula corresponding to $C_{39}H_{63}NO_{14}$; having an infrared absorption spectrum in chloroform solution substantially as shown in FIGURE 2 of the accompanying drawings and having the following absorption bands given in microns: 2.80, 3.35, 3.40, 5.81, 5.95, 6.28, 6.88, 7.11, 7.25, 7.61, 7.89, 8.45, 8.77, 9.27, 9.45, 9.92, 10.12, 10.42, 10.81, 11.10, 11.55, and 11.97; having a nuclear magnetic resonance absorption spectrum substantially as shown in FIGURE 4 of the accompanying drawings; having an ultraviolet spectrum in aqueous solution characterized by an absorption maximum at 283 mμ with a molar extinction:

$$E_{1\,cm.}^{1\%} = 280$$

giving positive tests for methoxy, hydroxy, N-methyl and C-methyl groups on group determination; giving a positive Molisch test, negative ninhydrin, biuret, Sakaguchi protein, and ferric chloride tests; decolorizing permanganate solution; giving the following $R_f$ values on paper chromatography: 0.20 in a methyl ethyl ketone solvent system using pH 4 buffered paper; 0.38 in a methyl ethyl ketone solvent system; 0.60 in an n-butanol saturated with water solvent system; and 0.86 in an aqueous solvent system containing 7 percent sodium chloride and 2.5 percent methyl ethyl ketone; and showing pronounced inhibitory activity against the following microorganisms: *Staphylococcus aureus, Staphylococcus albus, B. subtilis, Sarcina lutea, M. avium,* and *C. michiganse.*

3. The process of preparing lactenocin which comprises contacting macrocin with aqueous acid at a pH in the range two to three until a substantial quantity of lactenocin has been produced.

References Cited

Antibiotics and Chemotherapy, vol. 11, 1961, pp. 328–334.

Bergey's Manual of Determinative Bacteriology, 7th ed., page 799.

ALBERT T. MEYERS, *Primary Examiner.*

JULIAN S. LEVITT, *Examiner.*

S. ROSEN, *Assistant Examiner.*